United States Patent
Cheon et al.

(10) Patent No.: US 7,076,787 B2
(45) Date of Patent: Jul. 11, 2006

(54) SUPPORTING MULTIPLE PROTOCOLS WITH A SINGLE DEVICE DRIVER

(75) Inventors: David Cheon, Cupertino, CA (US); Jici Gao, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 796 days.

(21) Appl. No.: 10/159,579

(22) Filed: May 30, 2002

(65) Prior Publication Data

US 2003/0225931 A1    Dec. 4, 2003

(51) Int. Cl.
    *G06F 13/10*    (2006.01)
(52) U.S. Cl. .................................. 719/321; 719/320
(58) Field of Classification Search .................. 707/1; 719/320, 321
See application file for complete search history.

(56) References Cited

U.S. PATENT DOCUMENTS

| | | | |
|---|---|---|---|
| 5,185,864 A | 2/1993 | Bonevento et al. | |
| 5,522,086 A | 5/1996 | Burton et al. | |
| 5,559,965 A | 9/1996 | Oztaskin et al. | |
| 6,049,535 A | 4/2000 | Ozukturk et al. | |
| 6,081,511 A | 6/2000 | Carr et al. | |
| 6,157,619 A | 12/2000 | Ozukturk et al. | |
| 6,377,992 B1 | 4/2002 | Plaza Fernandez et al. | |
| 6,418,485 B1 | 7/2002 | Cooper et al. | |
| 6,510,164 B1 | 1/2003 | Ramaswamy et al. | |
| 6,665,739 B1 | 12/2003 | Vishlitzky et al. | |
| 6,735,756 B1 | 5/2004 | Linn et al. | |
| 6,738,829 B1 * | 5/2004 | Wiles et al. | 719/321 |
| 6,810,412 B1 | 10/2004 | Chang | |
| 6,874,147 B1 | 3/2005 | Diamant | |
| 6,885,652 B1 | 4/2005 | Ozukturk et al. | |
| 6,928,478 B1 | 8/2005 | Gangadharan | |
| 2002/0023179 A1 | 2/2002 | Stanley | |
| 2002/0083226 A1 | 6/2002 | Awashti et al. | |
| 2003/0093430 A1 * | 5/2003 | Mottur | 707/10 |
| 2003/0208652 A1 | 11/2003 | Kuhlmann et al. | |

* cited by examiner

*Primary Examiner*—William Thomson
*Assistant Examiner*—Andy Ho
(74) *Attorney, Agent, or Firm*—Park, Vaughan & Fleming LLP

(57) ABSTRACT

A system and method for implementing any one of multiple communication protocols with a single device driver. During initialization (e.g., after being attached to network interface device), a device driver receives a call (e.g., an ioctl) identifying a protocol to be implemented (e.g., PPP or SRP). The device driver configures device soft state structures for each network interface device with protocol-specific attributes (e.g., MTU size, references to protocol-specific packet handling functions). In response to an upper level protocol request (e.g., DL_INFO_REQ), the device driver dynamically assembles protocol-specific data to answer the request.

23 Claims, 12 Drawing Sheets

SUPPORTING MULTIPLE PROTOCOLS WITH A SINGLE DEVICE DRIVER

BACKGROUND

This invention relates to the field of computer systems. More particularly, a system and methods are provided for supporting multiple protocols, at one level of a protocol stack, with a single device driver.

SRP is a protocol designed for use in a bidirectional, counter-rotating ring network. An inner ring carries data in one direction, while an outer ring carries data in the opposite direction. Both rings are used concurrently.

Each node in the network is coupled to both rings, and therefore employs multiple (e.g., two) network interface circuits (NIC) or devices. In present implementations of SRP, a node manages two communication streams—one for each connection. Although SRP functions can be implemented in separate Streams modules, between the device driver and the higher level protocol (e.g., IP), the SRP protocol requires short response times, and the use of separate SRP stream modules can introduce additional software overhead and lead to unacceptable response times.

Despite the need to know the current network topology, so that each packet can be routed through the appropriate ring, the SRP specification does not indicate how the network topology should be recorded or represented. If an inefficient method is employed, many packets could be routed incorrectly.

Also, traditional network interface device drivers are configured to support only a single link level communication protocol (e.g., just SRP). Such a device driver may be hard-coded with attributes or parameters of that protocol (e.g., maximum transfer unit size). Therefore, if a different protocol is to be used (e.g., PPP—Point-to-Point Protocol), a different device driver must be installed or loaded. This causes redundancy of coding if there are any similarities between the different protocols, and both drivers must be updated if common functionality is changed.

In addition, a traditional physical communication interface device, such as a NIC, hosts a single logical communication device for a computer system. Therefore, the operating system of the computer only needs to execute a single attach (or detach) procedure to attach (or detach) a device driver for operating the physical device.

The use of multiple logical or physical communication devices, instead of a single device, can offer gains in communication efficiency. Although attempts have been made to operate multiple physical communication devices on a single computer board or card, it has been unknown to operate multiple logical devices on a single physical communication device in a manner that requires multiple device driver attaches.

And further, the programming for a hardware device (e.g., a NIC) controlled via an FPGA (Field Programmable Gate Array), or other similar component, is often stored on a programmable read-only memory such as an EEPROM (Electrically Erasable Programmable Read Only Memory). The EEPROM contents must be re-flashed whenever the programming changes. The device's firmware may also need to be changed, along with the hardware revision, which may be an expensive process. And, updating the device's programming requires the read-only memory to be re-flashed with the new program logic—a procedure that typically cannot be performed by an average user. This makes it difficult to keep hardware devices' programming up-to-date.

SUMMARY

A system and methods are provided for selectively implementing one of multiple communication protocols with one device driver.

In one embodiment of the invention, a device driver module is configured to selectively implement either PPP (Point-to-Point Protocol) or SRP (Spatial Reuse Protocol), depending on which is specified in a configuration file. During initialization, the device driver is informed (e.g., through an ioctl call) of the protocol to implement.

The device driver then configures one or more device soft state data structures (i.e., one for each network or communication interface it operates) to reflect the specified protocol. For example, attribute values corresponding to the protocol (e.g., MTU size, MRU size) are loaded, and pointers or references are established to protocol-specific functions (e.g., for encapsulating an outgoing packet, for receiving an incoming packet). Each device soft state structure is augmented with a "protocol" field that identifies the operative protocol.

When a DLPI (Data Link Provider Interface) request or ioctl is received from a higher level protocol (e.g., IP), the device driver responds with information specific to the protocol in use. Illustratively, this may require the dynamic assembly of data values for responding to a DL_INFO_REQ, or preparation of a layer two header in response to DL_IOC_HDR_INFO (e.g., to enable fastpath communications).

In one embodiment of the invention, the device driver may be configured with additional primitives or messages. For example, if the device driver is configured for SRP traffic and has provided a higher level protocol with a layer two header to enable fastpath communications, the device driver may subsequently determine that the network topology has changed. If the fastpath header is now incorrect (e.g., because it no longer identifies the correct ring to use for a particular connection), the device driver may issue a DL_NOTE_FASTPATH_FLUSH message to tell the higher level protocol to flush the header and request a new one.

DETAILED DESCRIPTION

Figure 1A:
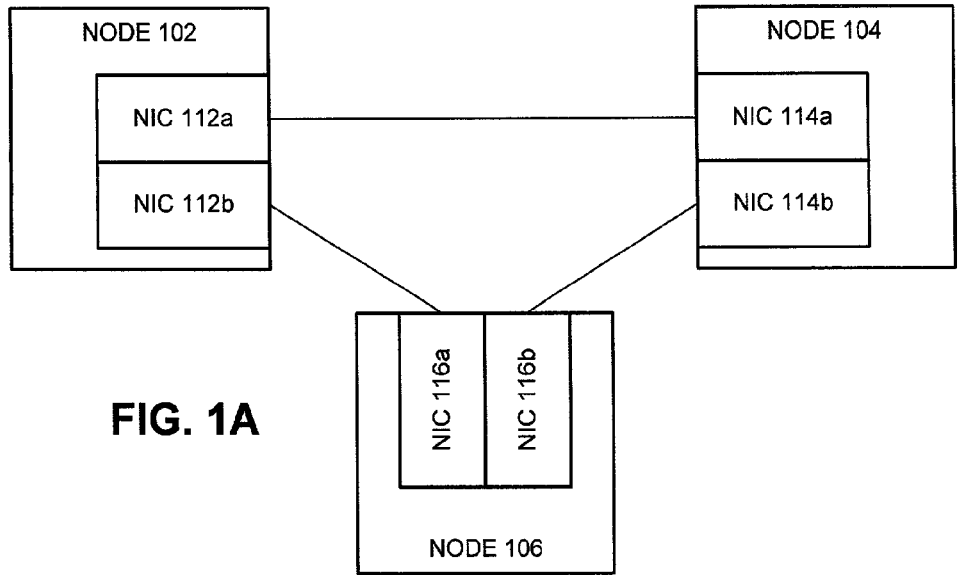
FIG. 1A is a block diagram depicting a PPP network in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, and transmission media (e.g., copper wire, coaxial cable, fiber optic media).

Introduction

In one embodiment of the invention, a system and method are provided for implementing a layer two (e.g., data link) protocol on a network node (e.g., a computer server) having multiple (e.g., two) network or communication link. In one particular implementation, the network node is part of a dual counter-rotating network topology. In this embodiment, the node employs separate Network Interface Circuits (NIC) for each network or communication link.

In another embodiment of the invention, a novel software configuration is provided for enabling the operation of multiple network interface devices with a single communication stream (e.g., an IP stream).

In another embodiment of the invention, a network node is configured for selective operation or execution of any one of a plurality of link layer communication protocols.

Implementations of different embodiments of the invention are well suited for network or communication environments using a dual, counter-rotating, ring configuration, such as that of an SRP (Spatial Reuse Protocol) network, or a point-to-point configuration. Thus, in illustrative embodiments of the inventions, a node's network protocol stack includes SONET (Synchronous Optical Network) or SDH (Synchronous Digital Hierarchy) at the physical layer, SRP or PPP at the data link layer, and IP (Internet Protocol) at the network level. Embodiments of the invention described herein are compatible with the Solaris® operating system of Sun Microsystems, Inc.

In an alternative embodiment of the invention, systems and methods are provided for facilitating the attachment (or detachment) of a device driver and multiple logical devices on one single physical hardware device. In yet another alternative embodiment of the invention, a system and method are provided for delivering logic for controlling physical operation of a hardware device through a device driver (e.g., rather than through a PROM on the device).

Figure 1B:
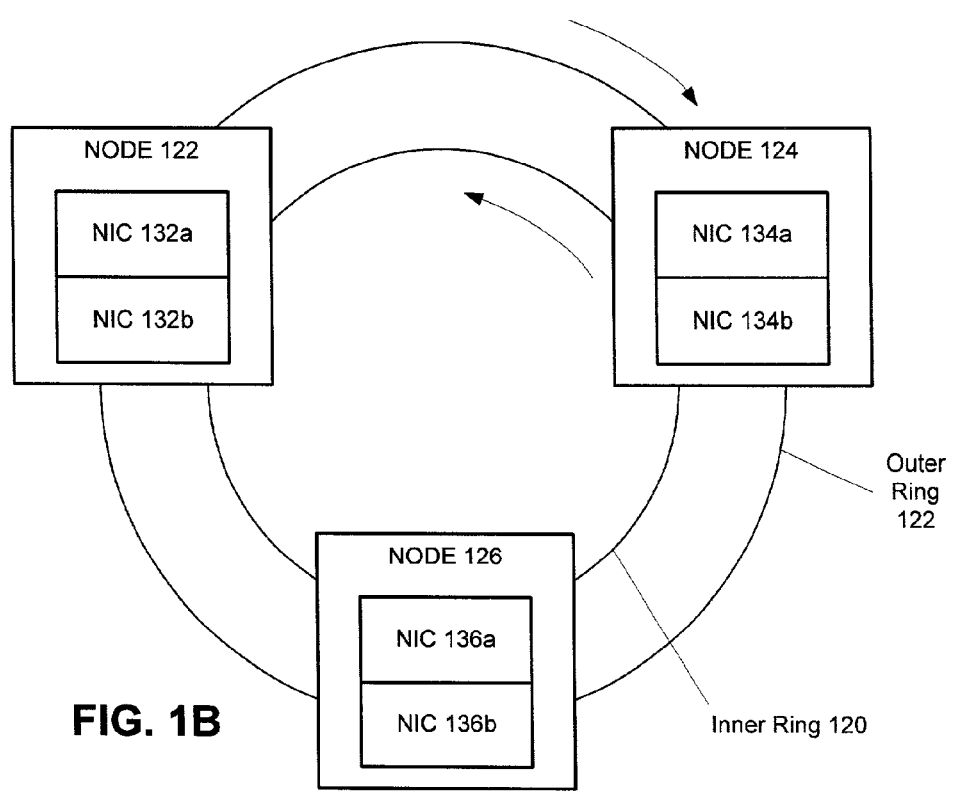
FIG. 1B is a block diagram depicting an SRP network in accordance with an embodiment of the present invention.

FIGS. 1A–B depict illustrative network configurations in which an embodiment of the invention may be practiced. FIG. 1A demonstrates nodes 102, 104, 106 interconnected using point-to-point connections. Each network interface circuit of a node hosts a point-to-point connection with another node.

FIG. 1B demonstrates nodes 122, 124, 126 deployed in a dual counter-rotating ring configuration. Inner ring 120 conveys data in one direction (e.g., counterclockwise), while outer ring 122 conveys data in the opposite direction (e.g., clockwise). In FIG. 1B, each NIC of a node is connected to both rings, as is done in SRP.

As described above, in one embodiment of the invention, a node may be configured to selectively operate one of a number of protocols at a particular layer of a protocol stack. Thus, nodes 102, 104, 106 of FIG. 1A may alternatively be operated as nodes 122, 124, 126 of FIG. 1B, depending on their configuration and initialization and the available network links.

In one embodiment of the invention, a NIC configured for an embodiment of the invention is a full-size PCI (Peripheral Component Interconnect) card for carrying OC-48 traffic over SONET (or SDH). The following sections describe different aspects of the invention, any or all of which may be combined in a particular embodiment of the invention.

Operating Multiple Device Driver Instances for Multiple Network Interface Devices on a Single Network Node In one embodiment of the invention, a network node employs multiple NICs or other components for accessing different communication links. In an SRP network comprising dual counter-rotating rings, for example, the node includes two NICs, one for each side of the rings. In a different network topology, such as a point-to-point configuration, the node may employ a separate NIC for each link, and thus include more than two NICs. Although this section describes an embodiment of the invention configured for network nodes comprising two NICs, one skilled in the art will appreciate how the following description may be amended for different configurations.

In this embodiment, one of the node's network interface devices is considered the "primary," while the other is the "mate." In normal operation, both may operate simultaneously (e.g., to send and receive data). For example, in an SRP network, both rings are active simultaneously, thereby requiring equivalent functionality between the two NICs. In accordance with the SRP specification, however, if one of the node's network links fails, it may enter a fail-over mode in which traffic received on the good link is wrapped around to avoid the failed link.

Each NIC is associated with a separate device soft state structure (referred to herein as "ips_t") to keep track of the NIC's status, provide access to the NIC's functions, etc. In this embodiment of the invention, a pointer "ipsp" facilitates access to the soft state structure of a particular device, and each device's soft state structure is expanded to include pointers to the primary NIC's data structure and the mate NIC's data structure.

Thus, ipsp_primary for the primary NIC points to NULL (because it is the primary), while the primary's ipsp_mate pointer references the mate's data structure. Conversely, in the mate's soft state data structure, ipsp_primary points to the primary's data structure and ipsp_mate is a NULL reference.

In an embodiment of the invention, both NICs are used with a single IP or communication stream, instead of having a separate stream for each NIC. The ipsp_primary and ipsp_mate pointers enable a single device driver to rapidly refer between the two NICs' data structures to invoke their respective functionality.

In this embodiment, outgoing communications (e.g., packets) are directed to the appropriate NIC by the device driver. In particular, the device driver may, by default, access the primary NIC's soft state data structure when a packet is to be sent. If the device driver determines that the primary is indeed the appropriate interface to use, then it simply invokes the primary's functionality as needed (e.g., to add a header, transmit the packet). As described below, the determination of which NIC to use may be made using a routing table or topology map assembled by the node.

If, however, the device driver determines that the packet should be sent via the mate NIC (e.g., because the ring to which the mate is coupled offers a shorter path), the device driver follows the primary's ipsp_mate pointer to access the mate's device soft state data structure, and then invokes the mate's functions as needed.

Incoming communications (e.g., packets) are simply passed upward, through the protocol stack, to an IP (or other network layer protocol) module. The device driver can invoke the appropriate NIC's receive functionality similar to the manner in which a NIC's transmit functionality is accessed.

The use of pointers between the NICs' device soft state structures allows rapid invocation of the appropriate NIC's operations, which is necessary because the ring decision-making process falls into a frequently executed code path.

Figure 2:
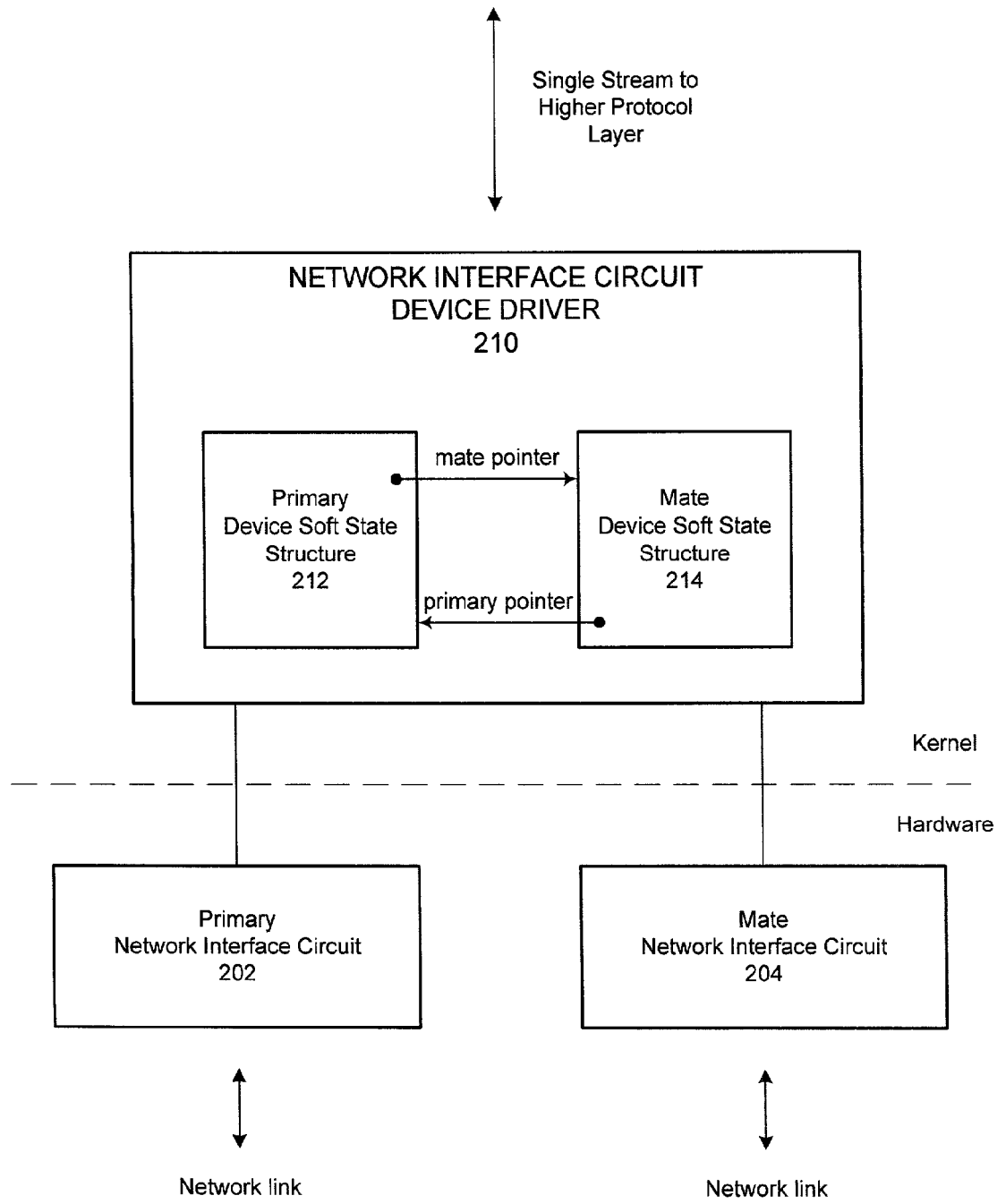
FIG. 2 is a block diagram demonstrating the use of interconnected device soft state structures for operating multiple network interface devices in one SRP node, according to one embodiment of the invention.

FIG. 2 demonstrates the use of a pair of device instances, cross-referenced with primary and mate pointers, to operate two network interface circuits for a single communication stream, according to one embodiment of the invention. In FIG. 2, primary network interface circuit 202 and mate network interface circuit 204 are coupled to corresponding network links. For example, in an SRP network, primary NIC 202 may transmit over a first (e.g., outer) ring and receive over a second (e.g., inner). Mate NIC would therefore transmit over the second ring and receive from the first.

NIC device driver 210 comprises separate device driver instances (not individually portrayed in FIG. 2), with a separate device soft state structure for each instance. Thus, primary soft state structure 212 corresponds to primary NIC 202 and mate soft state structure 214 corresponds to NIC 204. Device driver 210 is compatible and operable with, and according to, the Solaris operating system. Each device soft state structure maintains a pointer or reference to the other, as described above.

Device driver 210 hosts only one communication stream, and therefore receives all incoming and outgoing communications, and transfers them between a higher layer protocol module and one of the network interface circuits. Illustratively, if the embodiment of FIG. 2 employs IP as the network layer protocol, then only one IP stream needs to be defined through the device driver, and both NICs may share a single IP address.

Although multiple device driver instances are employed in the embodiment of FIG. 2, in one alternative embodiment of the invention a single device driver instance may control all NICs.

Software Configuration of a Network Node for Operating a Network Interface Device In this section, the software configuration of a network node is described in further detail, according to one or more embodiments of the invention.

In one embodiment of the invention, some or all data link functions (e.g., SRP or PPP functions) are embedded within a network interface device driver. This configuration contrasts with the traditional implementation of a separate Streams module for the data link protocol.

Figure 3:
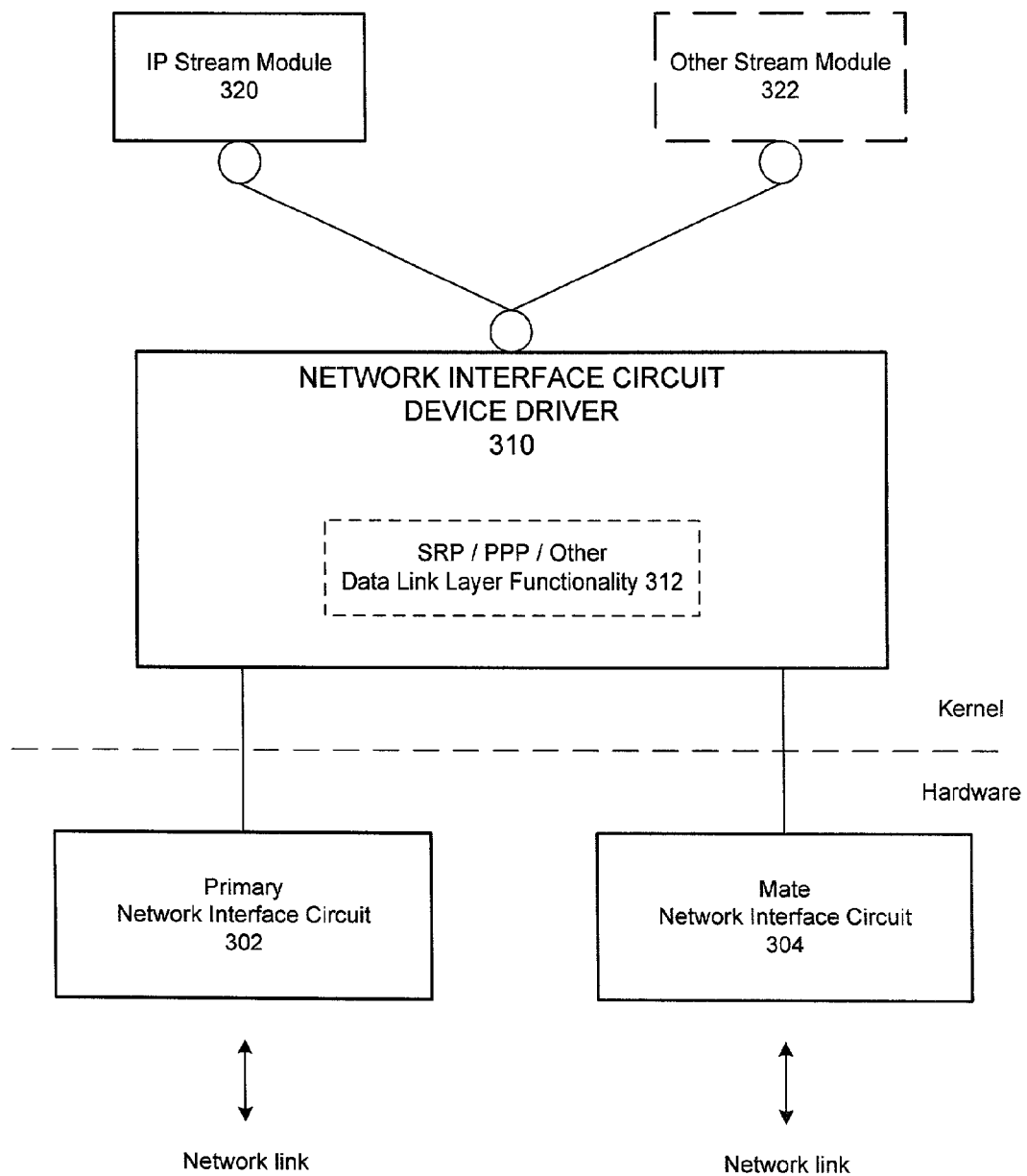
FIG. 3 is a block diagram demonstrating the inclusion of data link protocol functionality within a device driver, according to one embodiment of the invention.

FIG. 3 demonstrates the inclusion of SRP, PPP or other data link layer functionality within a device driver, according to one embodiment of the invention. In FIG. 3, IP Stream Module 320 and, optionally, some other Stream Module 322 exchange communications with network interface circuit device driver 310. Device driver 310 includes data link functions 312, of the operative data link layer protocol, for handling traffic at the data link level (e.g., to add or remove packet headers). Device driver 310 sends and receives network traffic via network interface circuits 302, 304.

In an SRP network environment, applying SRP functionality 312 allows the device driver to specify which ring (i.e., inner or outer) an outgoing packet should be transmitted on. The device driver then invokes the transmit function of the appropriate NIC (e.g., through its device soft state structure, as described above).

Figure 4:
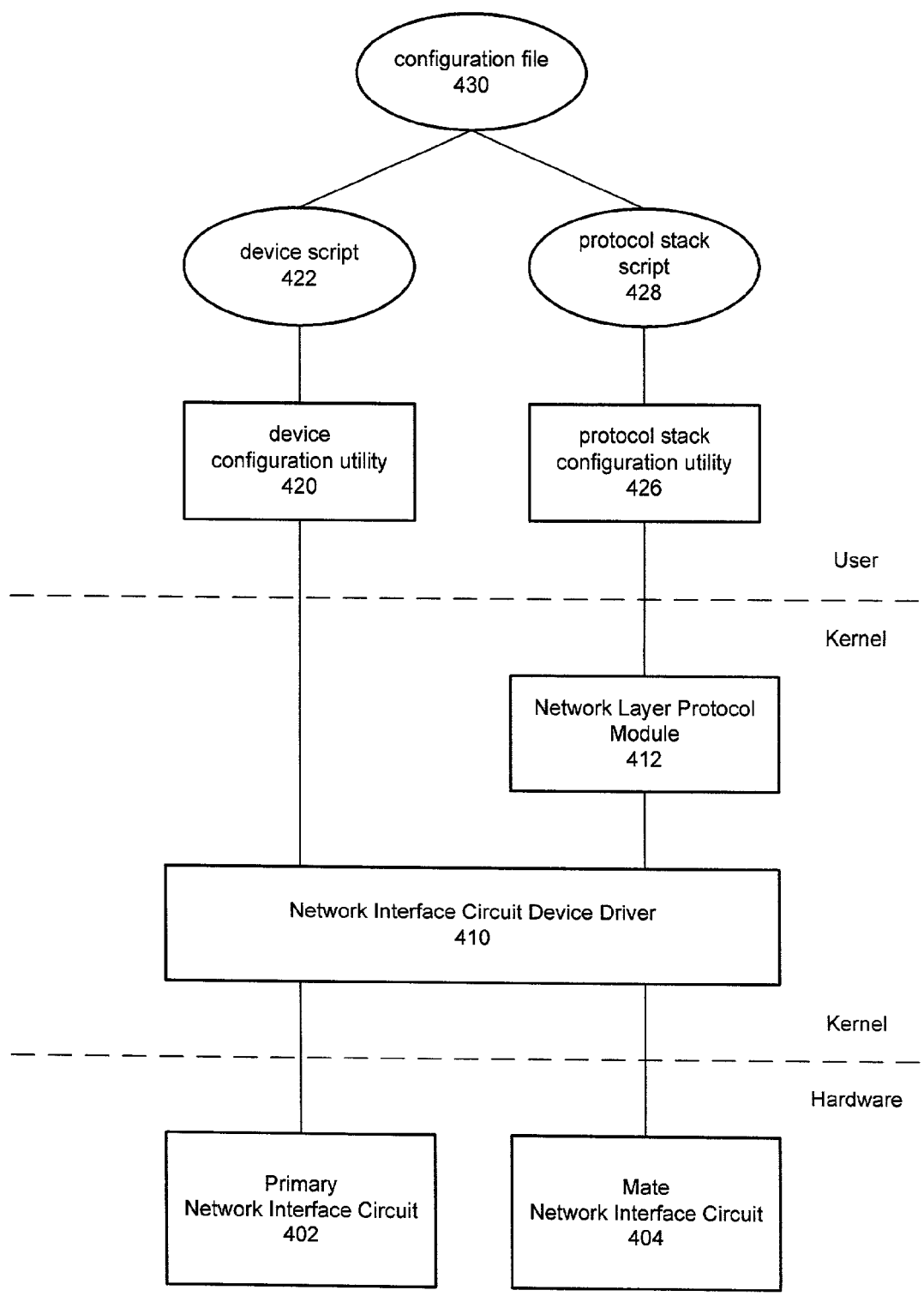
FIG. 4 depicts the software configuration of a network node in accordance with an embodiment of the present invention.

FIG. 4 diagrams the software modules and utilities employed in a network node in one embodiment of the invention. In this embodiment, configuration file 430 comprises stored parameters for configuring network interface circuit device driver 410 and data link layer functionality embedded in the device driver,—e.g., SRP options such as IPS timer, WTR Timer, Topology Discover Timer, etc. The configuration file may also store parameters/options for network layer protocol module 412. In one implementation of this embodiment, the network layer protocol is IP.

Based on the content (e.g., parameters, protocol options) specified in configuration file 430, device script 422 executes device configuration utility 420 in a corresponding manner. For example, device script 422 configures each network interface circuit of the node according to the stored configuration parameters. Device configuration utility 420 configures the data link layer protocol (e.g., SRP, PPP), and may also provide a user interface to allow a user to configure, query or examine the status or settings of the data link protocol, etc. For example, in an SRP network, device configuration utility 420 may be invoked to examine the topology mapping of an SRP node, set timers, etc.

Protocol stack script 428 uses the contents of configuration file 430, when executing protocol stack configuration utility 426, to plumb the network layer protocol (e.g., IP) module 412 on top of the device driver. Protocol stack configuration utility 426 may comprise the Solaris "ifconfig" utility.

Topology Discovery and Mapping for a Network Node

Topology discovery comprises the process by which a network node discovers or learns the topology of its network. For example, a node in an SRP network may perform topology discovery to identify other network nodes. Through topology discovery, the node can learn when another node enters or leaves the network, and the best path (e.g., inner ring or outer ring of an SRP network).

In one embodiment of the invention, a node in an SRP network is configured to conduct topology discovery when the node is initialized, whenever it learns of a topology change in the network, and/or at a regular or periodic time interval (e.g., every two or four seconds). At the conclusion of a topology discovery evolution, the node generates a topology map (e.g., as a doubly linked list), and constructs a routing table or other structure reflecting the available paths (e.g., number of hops) to another network node.

Figure 5A:
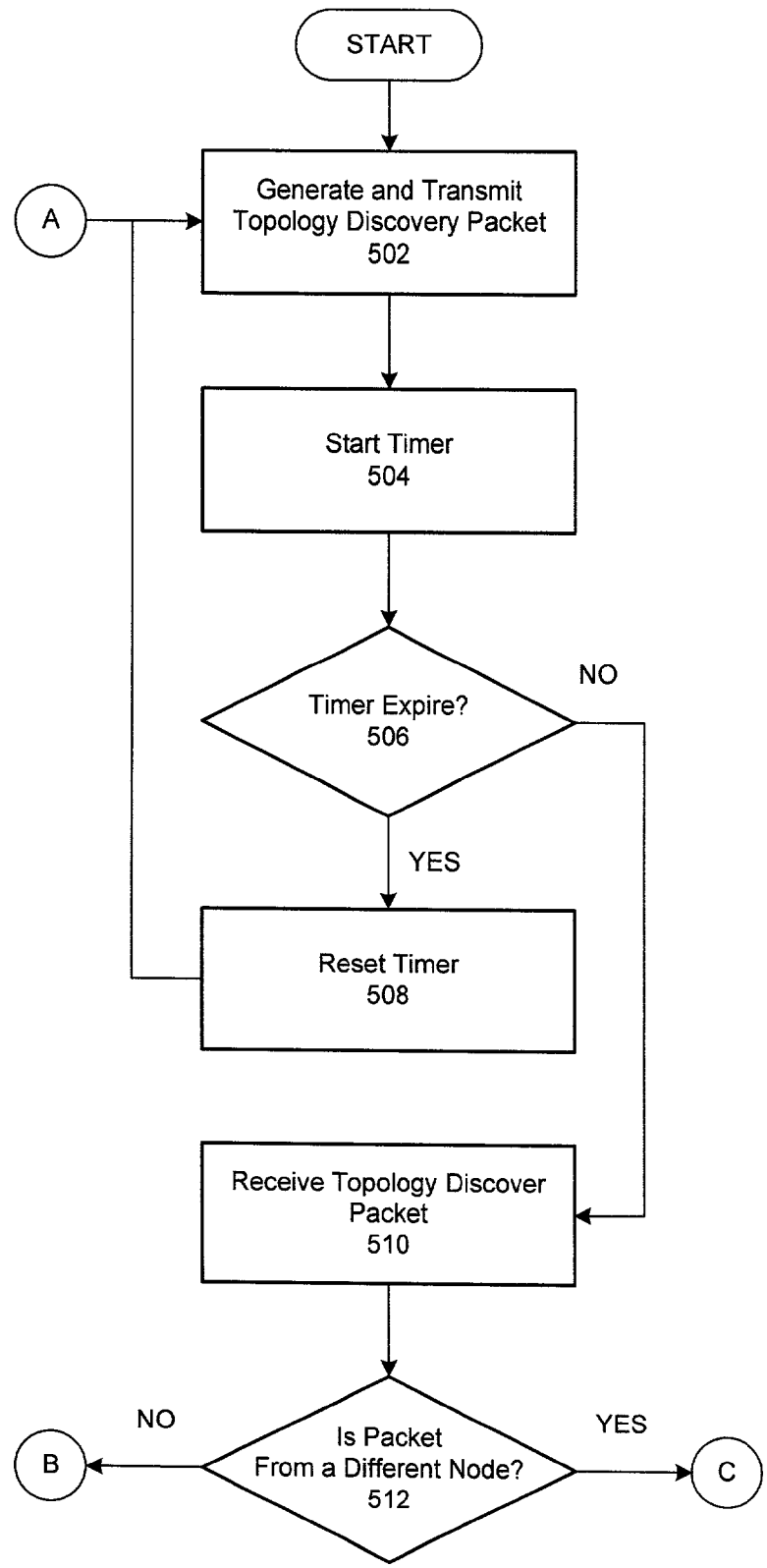
FIGS. 5A–C comprise a flowchart illustrating one method of generating a topology map for an SRP network, in accordance with an embodiment of the invention.
Figure 5B:
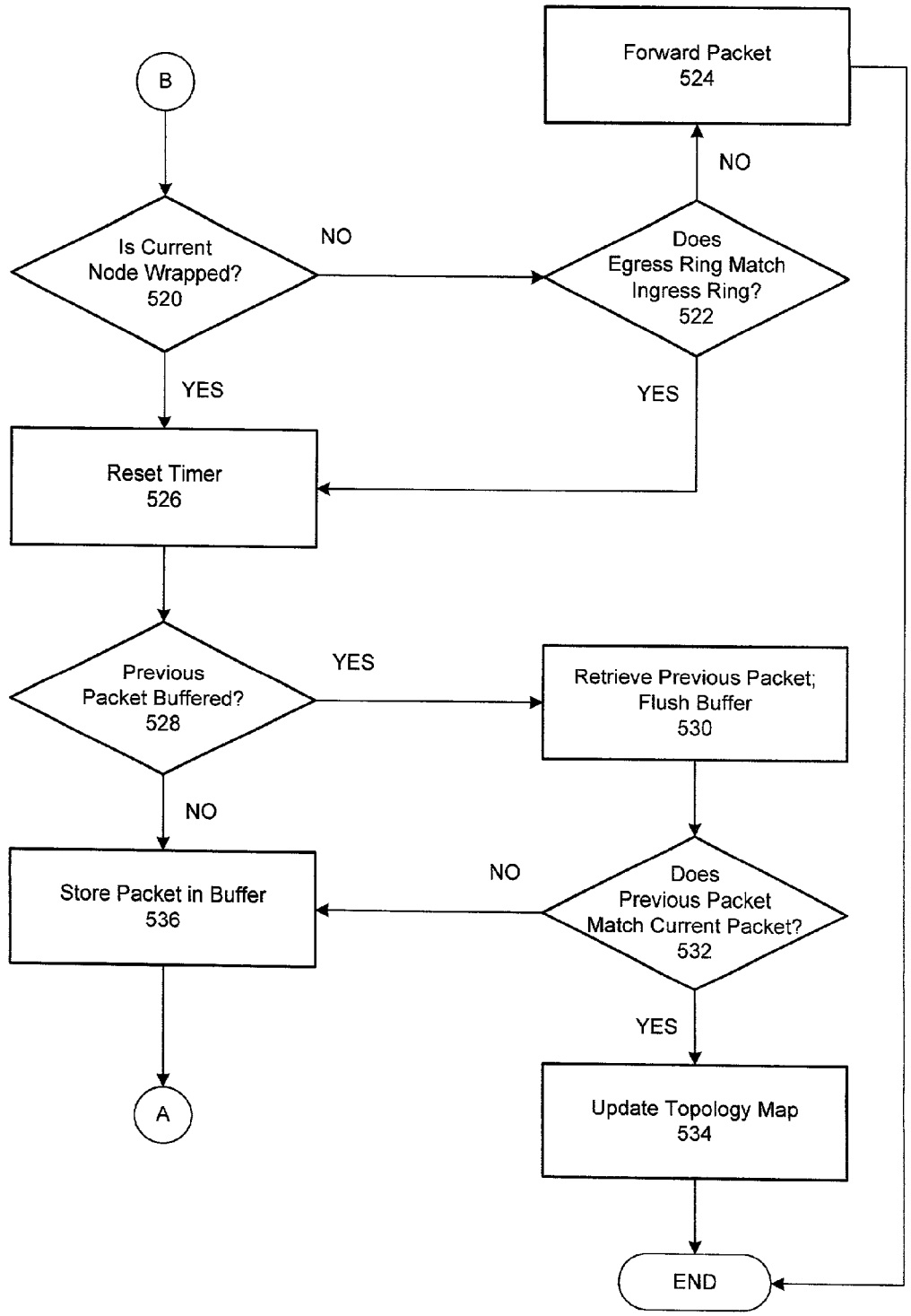
Figure 5C:
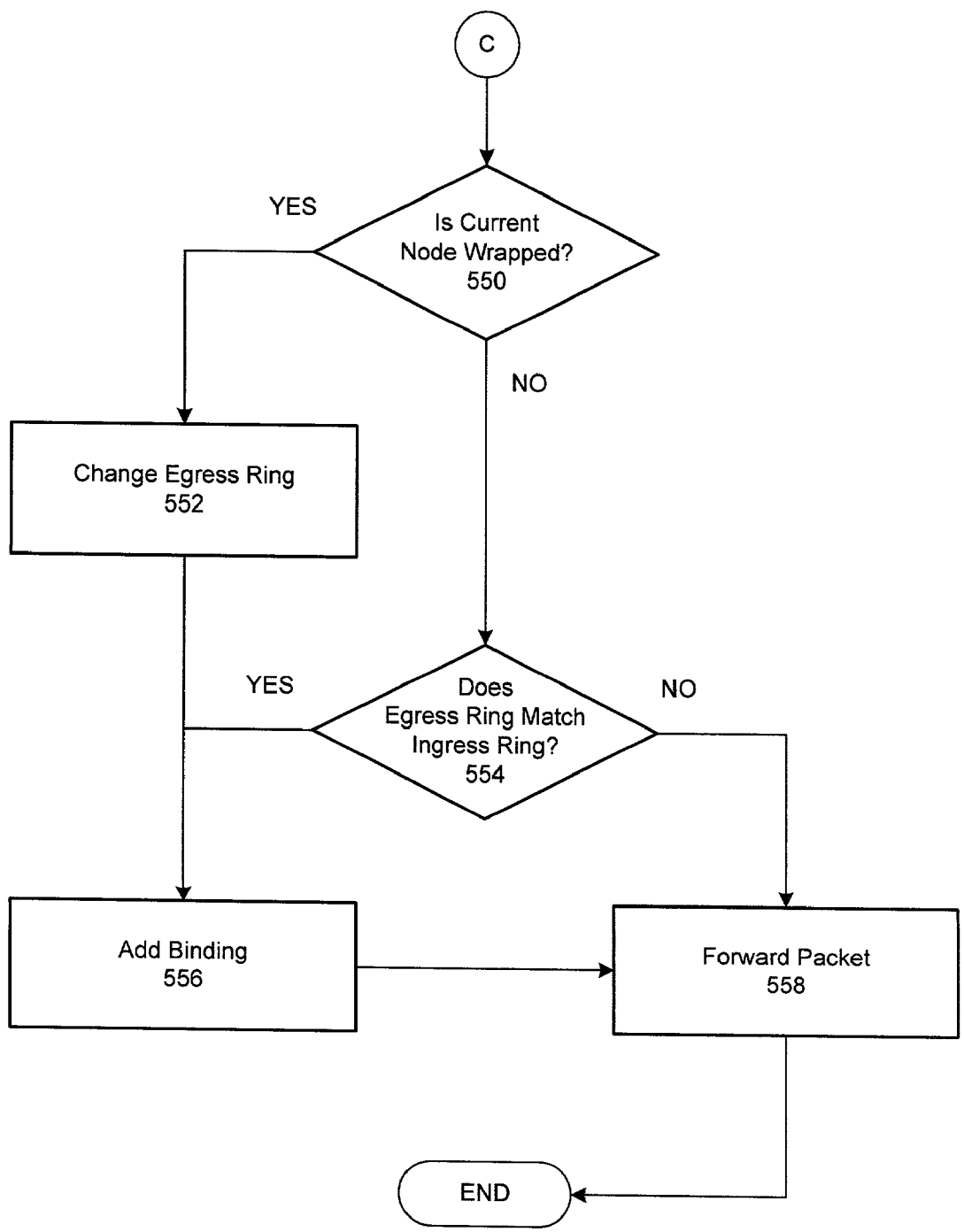

FIGS. 5A–C illustrate the generation, handling and processing of topology discovery packets, according to one embodiment of the invention. In state 502, a network node generates and transmits a topology discovery packet, and a timer associated with the packet is started in state 504. In state 506, the node determines whether the timer has expired before the packet is received (after passing through the rest of the nodes in the network).

If the timer expired, then the timer is reset in state 508 and the illustrated process returns to state 502 to generate another topology discovery packet. Otherwise, the process continues at state 510.

In state 510, a topology packet is received. In state 512, the current node determines (e.g., from a source address) whether the packet was sent by the current node or some other node. If sent by the current node, the illustrated method continues at state 520. Otherwise, the method advances to state 550.

In state 520, the node determines whether it is wrapped. The node may be wrapped if one of the network links coupled to the node has failed. If the node is wrapped, the method advances to state 526.

Otherwise, in state 522, the node determines whether the ring that would be used to forward the topology discovery packet (e.g., according to its routing table, discussed below) is the same as the ring from which it was received. If so, the method advances to state 526. Otherwise, in state 524, the packet is forwarded on the ring other than the one from which it was received, and the method ends.

In state 526, the packet can be considered to have fully traversed the network, and so the packet discovery timer is reset. In state 528, the node determines whether a previous topology discovery packet that it initiated is buffered. Illustratively, the node temporarily stores a previous packet for comparison purposes, to determine whether the network topology has changed.

In different embodiments of the invention, a different number of packets may need to match before the node will assume that the network topology is (temporarily, at least) stable. In this embodiment, only two packets need to match (i.e., the present packet and the previous packet). If there is no previous packet buffered, the method advances to state 536.

Otherwise, in state 530, the previous packet is retrieved and the packet buffer is flushed. In state 532, the node determines whether the previous packet matches the current packet (e.g., in terms of the indicated network topology). If they match, the node's network topology map is updated in state 534 and the procedure ends.

If the packets do not match in state 532, then in state 536 the current packet is placed in the packet buffer to await comparison with a subsequent topology discovery packet. The procedure then returns to state 502.

In state 550, the node has received a topology discovery packet sent by a different node, and first determines whether the current node is wrapped. If it is, then the egress ring (i.e., the ring onto which the packet will be forwarded) is changed in accordance with wrapped operations. The illustrated method then proceeds to state 556.

If the current node is not wrapped, then in state 554 the node determines whether the ring that would be used to forward the topology discovery packet (e.g., according to its routing table, discussed below) is the same as the ring from which it was received. If they are different, the method proceeds to state 558.

If they are the same, in state 556, a binding is added to add the current node to the network topology reflected in the packet. In state 558, the packet is forwarded to the next node. The procedure then ends.

When two matching topology discover packets are received, the SRP uses the contents to construct a topology map of the SRP network. In an embodiment of the invention, the map indicates the number of nodes on the SRP rings and includes a pointer or reference to a head entry in a double linked list representation of the network topology.

Figure 6:
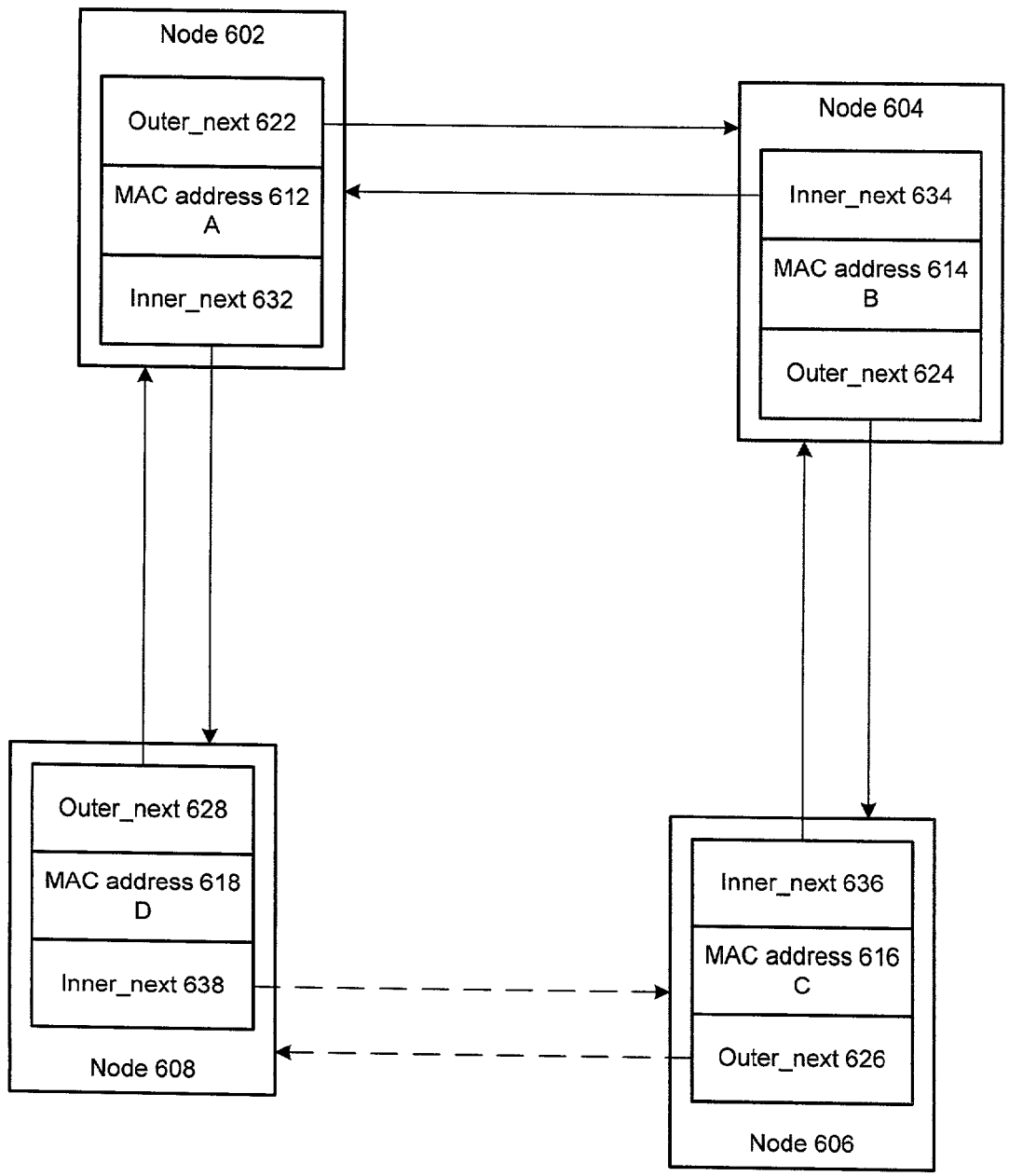
FIG. 6 depicts an SRP network configuration that may be represented in a routing table, according to one embodiment of the invention.

FIG. 6 is a linked list representation of a network topology according to one embodiment of the invention. Each node in the list, such as node 602, includes a MAC address (e.g., 612), a pointer (e.g., 622) to the next node on the outer ring, a pointer (e.g., 632) to the next node on the inner ring, and routing information (e.g., inner and outer ring counters that track hop count information to be used to generate a routing table). In the network depicted in FIG. 6, the dashed lines between nodes 606, 608 indicate a failed network connection. The corresponding links are therefore wrapped.

Using a topology map derived from a topology discovery packet, or directly from the packet contents, the node generates a routing table to facilitate its determination of which ring a particular packet should be transmitted on.

In one embodiment of the invention, a node's routing table comprises the following information for each node other than itself: a network address (e.g., MAC address), outer hop count, inner hop count and ring ID. The outer hop count and inner hop count indicate the number of hops to reach the other node via the outer ring and inner ring, respectively. The ring ID indicates which ring (outer or inner) a packet addressed to that node should be transmitted on. The ring ID may be selected based on which value is lower, the outer hop count or inner hop count. If they are equal, the node may select either ring.

Based on the network topology of FIG. 6, including the wrapped network links, a routing table similar to the following may be constructed for node 602 (having MAC address A):

| Node | Outer Hop Count | Inner Hop Count | Ring ID |
|------|-----------------|-----------------|---------|
| B    | 1               | 3               | 0       |
| C    | 2               | 4               | 0       |
| D    | 5               | 1               | 1       |

In this example, ring ID 0 corresponds to the outer ring, while ring ID 1 corresponds to the inner ring.

In one embodiment of the invention, when a NIC device driver receives a packet for transmission, embedded SRP functionality selects the appropriate ring to be used (e.g., by referring to the routing table) and the device driver invokes the transmission function(s) of the corresponding network interface circuit.

Supporting Multiple Protocols with One Device Driver

In an embodiment of the invention, a single network interface circuit device driver is configured to operate any one of multiple distinct data link layer communication protocols.

In an illustrative implementation of this embodiment, a NIC device driver is capable of supporting either PPP or SRP as the data link layer protocol for a NIC operated by the device driver. The device driver may operate multiple NICs simultaneously, as described in a previous section.

Although there are some similarities between PPP and SRP, there are also significant differences. For example, each protocol is used with a different network configuration (i.e., point-to-point versus dual counter-rotating rings). And, they employ several different attributes and parameter values, such as MTU (Maximum Transfer Unit) and MRU (Maximum Receive Unit) sizes, require different encapsulation and read functions, and so on.

In this implementation of the invention, the physical layer protocol of the network accessed through the device driver's NIC(s) is SONET or SDH. The network layer protocol may be IP.

When the device driver implements SRP as the data link layer protocol, it transfers IP packets between an IP Streams module and one or more NICs. When the device driver implements PPP, it still passes data between an IP Streams module and the NIC(s), but also interacts with a PPP daemon, a user-level software module for managing a data link.

Illustratively, the protocol to be implemented by the device driver may be specified in a user-modifiable configuration file accessed during initialization (e.g., configuration file 430 of FIG. 4). An ioctl (I/O control) call is made to the device driver (e.g., by device configuration utility 420 of FIG. 4) to indicate to the device driver which protocol is to be used. The device driver may then configure itself accordingly (e.g., load the appropriate attribute values, identify the appropriate protocol functions to invoke).

In one embodiment of the invention, the device driver maintains a device soft state structure for each NIC or other communication interface it operates. In this embodiment, the device driver supplements each device's soft state data structure with additional information. In particular, the device driver adds a "protocol" field to identify the protocol type in use (e.g., PPP, SRP), and "mtu_size" and "mru_size" fields identifying the MTU and MRU for the operative protocol.

Because the header forms or structures of the two protocols differ, the device driver also adds (to the device soft state structures) pointers or references to protocol-specific encapsulation and receive functions. In other embodiments of the invention, for PPP, SRP and/or other protocols, a device soft state structure may be supplemented with other information. Illustratively, after the device soft state structures are configured, the driver may commence the hardware initialization of the NIC(s).

In an embodiment of the invention, an upper layer protocol (e.g., IP) interacts with the device driver through DLPI (Data Link Protocol Interface), and no assumption can be made about which protocol the device driver is implementing. Therefore, the device driver may check the protocol field of a NIC's device soft state structure to determine how to interface with the upper layer protocol.

For example, when the device driver receives a DL_INFO_REQ request through DLPI, it must respond with a DL_INFO_ACK primitive configured according to the operative protocol. Instead of replying with a static block of data (i.e., dl_info_act_t), the data block returned with the primitive may be dynamically assembled depending on the protocol. In particular, the following fields may be dynamically configured: dl_min_sdu, dl_mac_type, dl_addr_length, dl_brdcst_addr_length and dl_brdcst_addr_offset. Some fields of the data block may not apply to the protocol that is currently operating. Those fields may be configured accordingly (e.g., set to zero).

By dynamically assembling the dl_info_act_t structure (or at least the values that depend on the protocol in use), the device driver can support multiple protocols and still interface with the higher level protocol as needed. In one alternative embodiment of the invention, all of the contents of the dl_info_act_t structure that can be configured during initialization (e.g., when the device driver is instructed which protocol to use) are so configured. The other contents can then be quickly configured in response to a DL_INFO_REQ request.

As one skilled in the art will appreciate, a device driver may support "fastpath" as well as "slowpath" transmissions. Slowpath communications require the device driver to encapsulate (with a layer two header) a payload received from a higher level protocol. Fastpath communications are received from the higher level protocol with a layer two header already attached. A device driver configured according to an embodiment of the invention can support both modes of transmission.

For slowpath communications, the device driver invokes the protocol-specific encapsulation function, of the appropriate network interface device, when an outgoing packet is received. As discussed above, this function may be identified in or through a device's soft state structure.

To enable fastpath communications, an upper level protocol module may initiate a DL_IOC_HDR_INFO ioctl to the device driver. If the device driver can support fastpath, it assembles a layer two header for the specified network connection, and sends it to the upper level protocol module. The header will then be prepended, by the upper level protocol, to subsequent transmissions for the connection. The device driver will assemble the layer two header for the appropriate layer two protocol by first determining (e.g., from a device soft state structure) which protocol is active for the connection.

As one skilled in the art will appreciate, an SRP header includes a "ring ID" meant to identify the network link (e.g., ring) to use for a connection with a specified network node. Because the topology of an SRP network may change, as described as in the topology discovery section above, the NIC or network link that should be used for a connection to a particular node may change during the life of the connection. Therefore, a layer two header provided to an upper level protocol for a given connection may become invalid.

Thus, in one embodiment of the invention, a new or non-standard DLPI primitive, DL_NOTE_FASTPATH_FLUSH is employed by the device driver. If the device driver detects a topology change, particularly a change that affects the network link to be used for a connection to another node, the device driver issues this primitive to the upper level protocol. In response, the upper level protocol will flush its fastpath setting (e.g., the layer two header for a connection) and issue a new DL_IOC_HDR_INFO ioctl to the device driver.

Some DLPI interfaces may be supported for one protocol, but not another. For example, DL_ENABMULTI_REQ and DL_DISABMULTI_REQ can be used with SRP, but are meaningless, and therefore not used, for PPP. As another example, because there is no variable address field in a PPP header, the DL_SET_PHYS_ADDR_REQ message is only used for SRP.

When a device driver receives a packet for transmission, if it is a slowpath communication the device driver will determine the operative protocol and invoke the appropriate encapsulation. If it is a fastpath communication, the layer two header will already be attached.

If the operative protocol is SRP, the device driver also must determine which ring the outgoing packet should be transmitted over, in order to forward the packet to the appropriate NIC. If the packet arrived in fastpath mode, the prepended layer two header will include the ring ID indicating which ring to use. For slowpath, the device driver will determine the ring ID from a routing table (described in a previous section) when encapsulating the packet.

For incoming communications, if the protocol is SRP, data packets are sent to the upper level protocol module and SRP control packets may be directed to the appropriate protocol handling function(s) within the device driver. If the operative protocol is PPP, then PPP control packets may be directed to a PPP daemon, and data packets may be sent to the upper level protocol module.

Attaching a Device Driver to Multiple Logical Devices on One Physical Device

In one embodiment of the invention, a system and method are provided for attaching a communication device driver to (or detaching the device driver from) multiple logical devices defined on a single physical communication device. This embodiment may be implemented, for example, to facilitate operation of multiple PCI (Peripheral Component Interconnect) functions or sub-functions on a physical Network Interface Circuit (NIC) board or card (e.g., a PCI card).

In an embodiment of the invention, a network node is a multiprocessor computer operating the Solaris operating system. Further, the node may include multiple PCI NICs. For example, in an SRP (Spatial Reuse Protocol) network the node may employ two separate NICs to enable full use of the dual, counter-rotating ring network. In a PPP (Point-to-Point Protocol) network, a node may include one or more NICs.

In this illustrative embodiment, each NIC in the network node is a PCI device configured for up to four logical devices. The use of multiple logical devices can enable substantial communication efficiencies. In particular, the number of logical devices can exactly correspond to the number of interrupt lines in the NIC's PCI configuration space and the number of computer processors for managing communications handled by the logical devices. Thus, each logical device may be registered with a different interrupt line, and each interrupt line can be serviced by a different processor.

Figure 7:
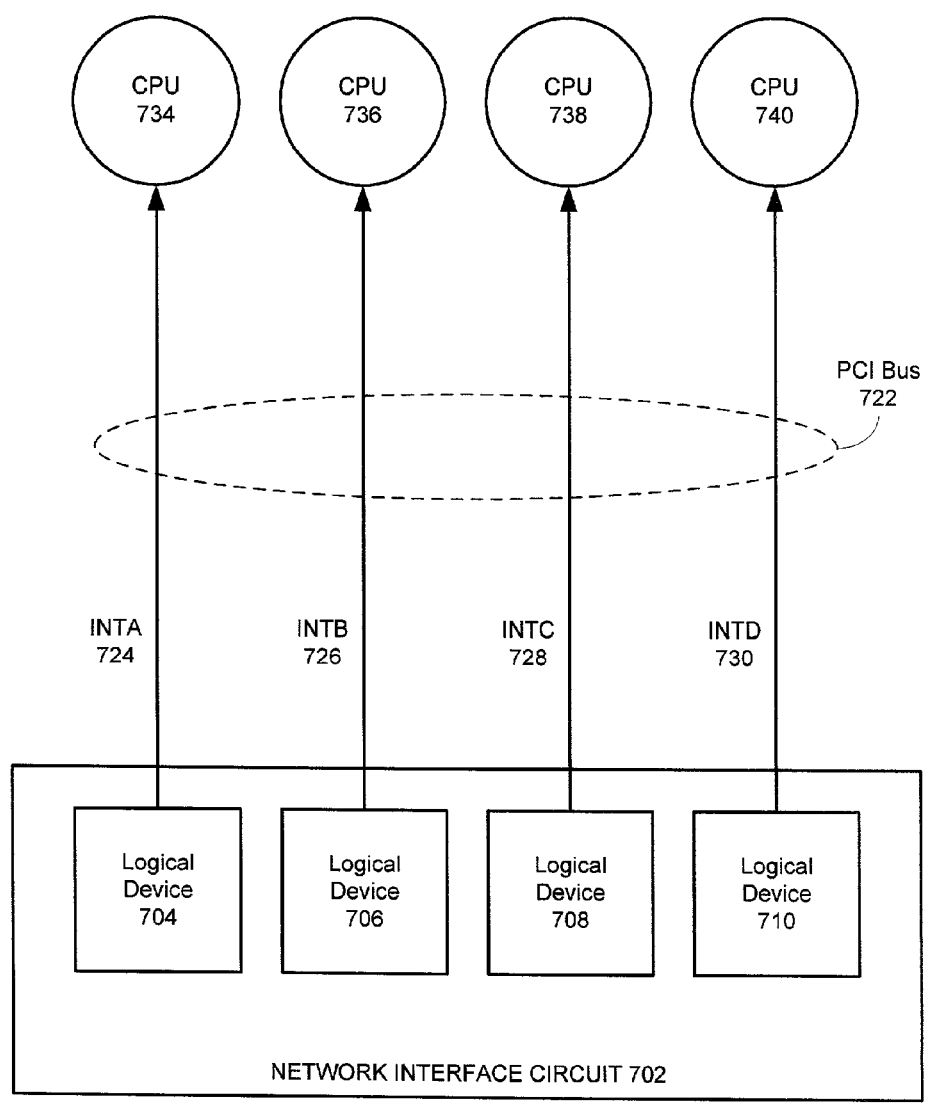
FIG. 7 is a block diagram of a network interface device hosting multiple logical devices, according to an embodiment of the present invention.

FIG. 7 illustrates a physical communication device hosting multiple logical devices, according to one embodiment of the invention. NIC 702 is a full-size PCI board capable of hosting up to four logical devices 704, 706, 708, 710. Among its components, PCI bus 122 provides interrupt lines 724, 726, 728, 730 for signalling interrupts between the logical devices and processors 734, 736, 738, 740.

In the embodiment of FIG. 7, the four logical devices may participate in a single IP (Internet Protocol) communication stream and share a single IP address (where the network layer protocol is IP). Each logical device may, however, host a different Transport Control Protocol (TCP)/IP connection and/or application (e.g., http, NFS (Network File System), FTP (File Transport Protocol), OLTP (Online Transaction Protocol)), and may therefore be associated with a different TCP port.

Because there are four separate logical devices in the embodiment of FIG. 7, the operating system of the host node will invoke an "attach" procedure four times, to attach a device driver to each device. For example, in the Solaris operating system, the Solaris kernel will recognize four devices in the PCI configuration space of NIC 702, and invoke the driver attachment function (a function identified by *devo_attach) of the device operations structure (dev_ops) for each logical device. Similarly, when detaching the device driver from the logical devices, the Solaris kernel will call the detachment function (identified by *devo_detach) four times.

Because the attach (or detach) function is performed multiple times for a single physical device in an embodiment of the invention, the system will track the progress of the attachment (or detachment) operations. In particular, because the hardware (e.g., NIC) that hosts multiple logical devices may only be initialized after the device driver attachments have completed, there needs to be some way of determining when each logical device has been attached. An operating system may not perform the attachments in a predictable sequence (e.g., particularly when the node includes multiple physical devices), thereby making the procedure more complex.

Figure 8:
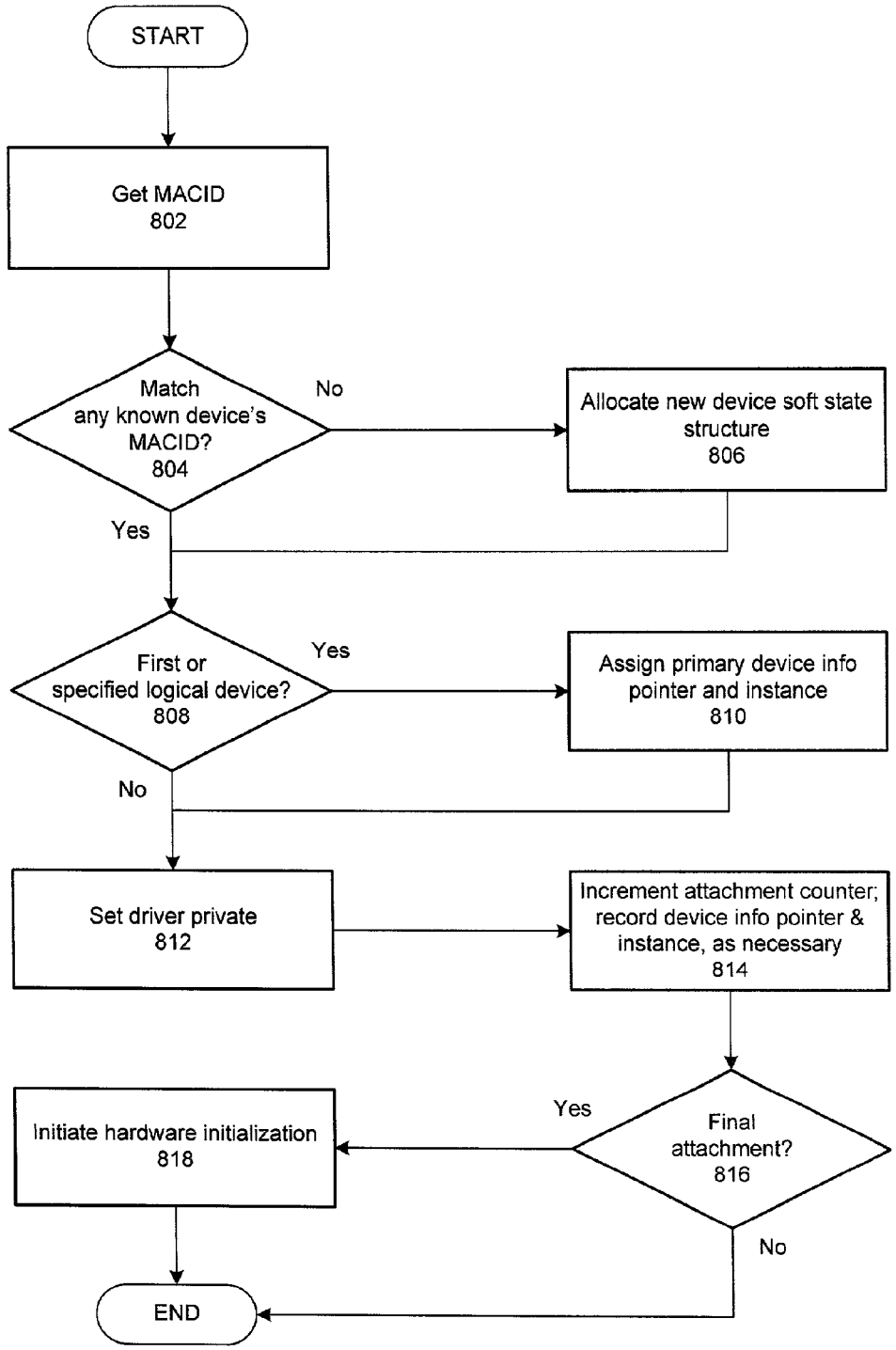
FIG. 8 is a flowchart illustrating one method of facilitating the attachment of multiple logical devices for a single physical communication interface device, according to an embodiment of the invention.

FIG. 8 demonstrates a procedure for performing device driver attachments for multiple logical devices of a single physical device, according to one embodiment of the invention. In this embodiment, the operating system used by the computer system is Solaris, and one single device driver (corresponding to the physical device) is attached to each logical device of the physical device. In an alternative embodiment, multiple device drivers may be used.

In state 802, the operating system recognizes a logic device and initiates its "attach" procedure for that device. Therefore, the MAC-ID (Medium Access Control identifier), or MAC address, of the physical device on which the logical device is located is obtained (e.g., by reading it from a device PROM).

In state 804, the current MAC-ID (of the physical device) is compared to the MAC-IDs of any known physical devices. In particular, in one embodiment of the invention, the device driver constructs a separate device soft state structure for each physical device, and the structures (if there are more than one) are linked together (e.g., via pointers or other references). Each device soft state structure contains various information or statuses of the corresponding physical device, including the MAC-ID. Thus, the linked structures can be traversed and searched for a MAC-ID matching the current MAC-ID. If a match is found, the illustrated method advances to state 808.

Otherwise, in state 806, this is the first attachment for the current physical device. Therefore, a new device soft state structure is allocated and initialized for the device, and its MAC-ID is set to the current MAC-ID. Also, the device driver may initialize a few bookkeeping values described shortly (e.g., to count the number of attachments, record the logical devices' device information pointers and record instance identifiers assigned to the logical devices).

In state 808, a determination is made as to whether the current attachment is attaching a logical device having a specified node name or binding name. For example, if the node names of the four logical devices in FIG. 7 were a11, a12, a13 and a14, state 808 may involve the determination of whether node a11 is being attached. If not, the procedure continues at state 812.

Otherwise, in state 810, the device information pointer (dip) assigned to a logical device having a specified node name is assigned as the primary_dip for the physical device. A dip is assigned to each logical device, by the operating system, during the attach function. Illustratively, the primary dip is saved for use as a parameter for identifying the physical device when invoking a DDI function (e.g., during initialization of the physical device after all of the logical device attachments).

In an embodiment of the invention, the DDI functions that are invoked once for each physical device, after the device driver has been attached to all logical devices, may include any or all of the following: pci_config_setup, ddi_regs_map_setup, ddi_get_iblock_cookie, ddi_ptob, ddi_dma_alloc_handle, ddi_prop_create and ddi_prop_remove_all. Other functions may be invoked for each logical device and may therefore require the individual device soft state pointers assigned to each logical device. These functions include any or all of the following: ips_add_softintr, ddi_create_minor_node, ddi_remove_minor_node, ddi_report_dev, ddi_remove_intr and ddi_set_driver_private. Some of functions identified herein may be used in conjunction with device driver detach operations rather than attach operations.

Also, the instance identifier assigned to the specified logical device may be recorded for use (e.g., as primary_instance) when plumbing the protocol stack for the device driver. Illustratively, an instance identifier is assigned by the operating system to each logical device during execution of the attach function. In an alternative embodiment, any of the device information pointers or instance identifiers may be used as the "primary" (i.e., not necessarily the identifier of the specified or first device).

In state 812, the DDI interface (e.g., ddi_set_driver_private) is invoked to associate the dip assigned to the current logical device with the device soft state structure of the physical device. Thus, the device information pointers for all the logical devices of one physical device will be associated with the physical device's device soft state structure. In particular, the address of the physical device's device information pointer may be recorded in each logical device's device information pointer.

In state 814, an attachment counter is incremented for the current physical device, in order to determine when the device driver has been attached to the last (e.g., fourth) logical device. In addition, the instance identifier and device information pointer may be recorded (e.g., in arrays).

In state 816, the device driver determines whether this attachment function was for the final (e.g., fourth) logical device. This determination may be aided by reference to an attachment counter described above. If this was not the final attachment, the illustrated method ends or repeats with the attachment of the next logical device.

Otherwise, in state 818, after the final attachment, initialization of the hardware (the physical device) can be initiated, along with allocation of resources and registration of interrupts, to complete the attach sequence.

After state 818, the procedure ends.

Illustratively, the method of FIG. 8 may be applied by a device driver associated with the physical device. The actual attachment of a logical device may be performed by the kernel (e.g., by invoking the device driver's attach function).

Figure 9:
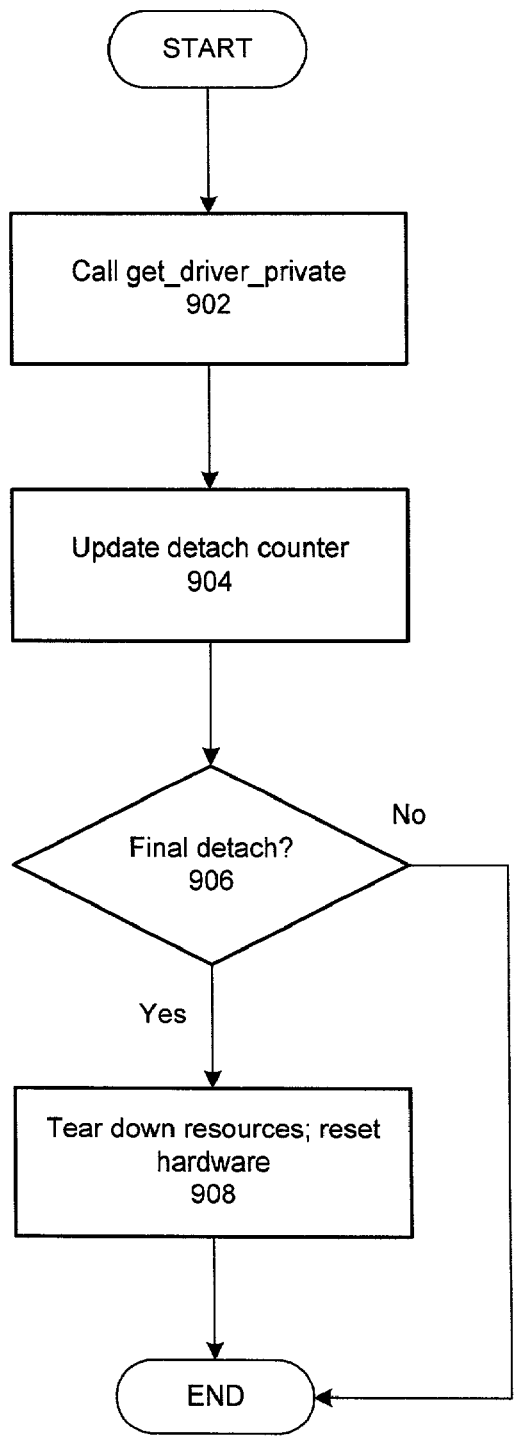
FIG. 9 is a flowchart illustrating one method of facilitating the detachment of multiple logical devices for a single physical communication interface device, according to an embodiment of the present invention.

FIG. 9 demonstrates a procedure for detaching logical devices of a physical communication device, according to one embodiment of the invention.

In state 902, the operating system invokes the detach function for an attached logical device. Using the device information pointer (dip) of that logical device, the device soft state structure of the physical device is located by invoking get_driver_private, using the dip as a parameter. Illustratively, the kernel tracks the dip associated with each logical device and provides it to the device driver when invoking the detach function.

In state 904, a detach counter associated with the physical device is updated to indicate that another logical device has been detached.

Based on the detach counter (or some other indicator), in state 906 a determination is made as to whether all (e.g., four) logical devices have been detached. If not, the illustrated procedure ends, to await detachment of another logical device.

Otherwise, in state 908, all logical devices have been detached. Therefore, the device driver tears down resources allocated to the physical/logical devices (e.g., the device soft state structure, device information pointers) and resets the physical device.

Illustratively, the method of FIG. 9 may be performed by the device driver associated with the physical device, in response to a detachment request from the kernel.

Delivering Hardware Programming Via a Device Driver

In one embodiment of the invention, logic for operating an FPGA (Field Programmable Gate Array), or a similar component configured to control a hardware device (e.g., a network interface circuit), is delivered to the FPGA via a device driver.

In this embodiment, the FPGA logic is merged with device driver logic in a device driver file. When the operating system (of the computer system in which the hardware device is installed) loads the device driver and attaches it to the device, as part of the hardware initialization process the device driver downloads the FPGA logic to the FPGA. The FPGA logic may be configured as a data array within the device driver file.

Figure 10:
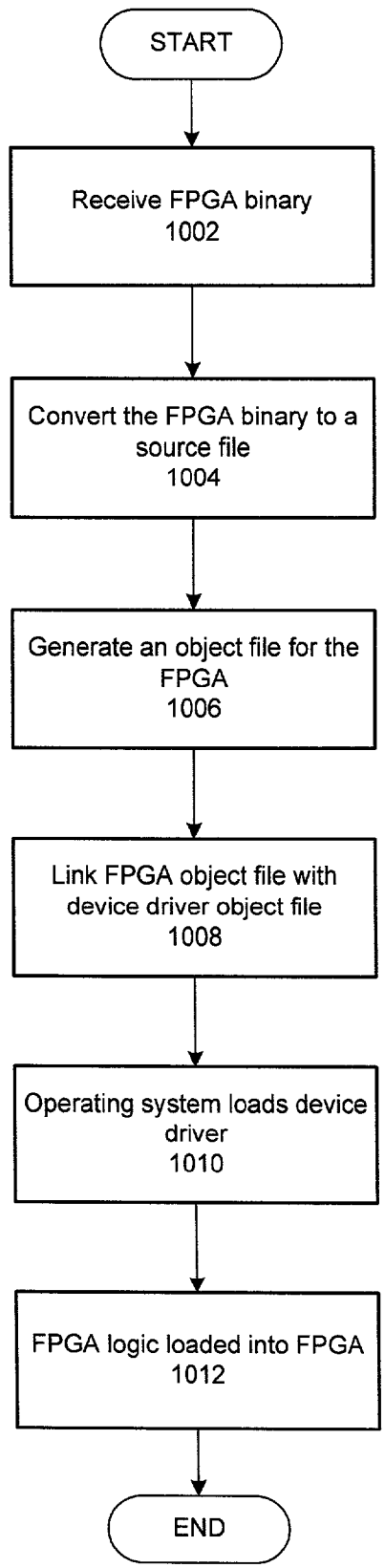
FIG. 10 is a flowchart demonstrating one method of delivering a hardware device's programming via a device driver, according to an embodiment of the invention.

FIG. 10 demonstrates a method of using a device driver file to deliver a hardware device's operating logic, according to one embodiment of the invention. In this invention, the hardware device is a network interface device (e.g., a NIC), and the logic is executed by an FPGA. Other embodiments of the invention may be derived from the following description.

In state 1002, the source or raw FPGA binary for controlling the physical operation of the network interface device is received or accessed. For example, an FPGA binary file may be provided by a vendor of the hardware device that includes the FPGA.

In state 1004, the FPGA binary is converted into a text file or other file suitable for compilation. For example, the FPGA binary content may be structured as an array of bytes, or other suitable data structure, within a ".c" file, for compilation by a C compiler.

In state 1006, the source file is compiled to produce an object file containing the FPGA binary data.

In state 1008, the FPGA object file is linked with a device driver object file. The two object files are combined to form a loadable module recognizable to a computer operating system.

In state 1010, the operating system loads the device driver module as part of its initialization of the network interface device. A part of the initialization, the device driver may be attached to the network interface device, or one or more logical devices defined on the network interface device.

In state 1012, the hardware initialization of the network device is initiated (e.g., by the device driver) and the device driver loads the FPGA data into the FPGA. Illustratively, the device driver may post the FPGA data, including the new FPGA binary, into static RAM and invoke the embedded firmware to load the FPGA binary and program it into the FPGA. When the hardware completes initialization, the network interface device then operates according to the code downloaded into the FPGA.

The foregoing descriptions of embodiments of the invention have been presented for purposes of illustration and description only. They are not intended to be exhaustive or to limit the invention to the forms disclosed; the scope of the invention is defined by the appended claims.

What is claimed is:

1. A method of supporting multiple protocols with one device driver of a first node of a network, the method comprising:
   identifying to a network interface device driver a first protocol to be handled by the device driver, wherein the device driver is capable of handling any one of a plurality of protocols;
   at the device driver, configuring a device soft state structure for each of one or more network interface devices to indicate the use of said first protocol;
   initiating a hardware initialization of the one or more network devices;
   receiving at the device driver a request from a higher level protocol for a header template for the first protocol;
   assembling a header template corresponding to said first protocol;
   sending said header template to the higher level protocol;
   determining that a topology of the network has changed subsequent to said sending said header template; and
   issuing a message to the higher level protocol to flush said header template.

2. The method of claim 1, further comprising, prior to said identifying, reading a configuration file to determine which of the plurality of protocols the network interface device driver is to be configured for.

3. The method of claim 1, wherein said configuring comprises storing an identity of said first protocol within said device soft state structure.

4. The method of claim 1, wherein said configuring comprises:
   loading a set of attribute values specific to said first protocol; and
   establishing references to one or more protocol-specific functions for handling a communication packet.

5. The method of claim 4, wherein said attribute values include:
   a size of a maximum transfer unit for said first protocol; and
   a size of a maximum receive unit for said first protocol.

6. The method of claim 4, wherein said establishing references comprises:
   establishing a reference to a header encapsulation function specific to said first protocol; and
   establishing a reference to a packet receive function specific to said first protocol.

7. The method of claim 1, further comprising:
   receiving at the device driver a DL_INFO_REQ request from a higher level protocol; and
   dynamically assembling one or more field values of dl_info_act_t to be returned to the higher level protocol in response to said DL_INFO_REQ request.

8. The method of claim 7, wherein said field values include one or more of: dl_min_sdu, dl_mac_type, dl_addr length, dl_brdcst_addr_length and dl brdcst addr offset.

9. The method of claim 1, wherein the request from the higher level protocol comprises a DL_IOC_HDR_INFO request.

10. The method of claim 1, further comprising:
    receiving a second DL_IOC_HDR_INFO request from the higher level protocol;
    assembling a new header template corresponding to said first protocol; and
    sending said new header template to the higher level protocol;
    wherein said new header template comprises a routing indicator different from a routing indicator of said header template.

11. The method of claim 10, wherein said routing indicator is an identifier of a ring of an SRP network.

12. A computer readable storage medium storing instructions that, when executed by a computer, cause the computer to perform a method of supporting multiple protocols with one device driver of a first node of a network, the method comprising:
    identifying to a network interface device driver a first protocol to be handled by the device driver, wherein the device driver is capable of handling any one of a plurality of protocols;
    at the device driver, configuring a device soft state structure for each of one or more network interface devices to indicate the use of said first protocol;
    initiating a hardware initialization of the one or more network devices;
    receiving at the device driver a request from a higher level protocol for a header template for the first protocol;
    assembling a header template corresponding to said first protocol;
    sending said header template to the higher level protocol;
    determining that a topology of the network has changed subsequent to said sending said header template; and
    issuing a message to the higher level protocol to flush said header template.

13. A method of selectively operating a network device driver to implement one of multiple link layer protocols, the method comprising:
    attaching the device driver to one or more network interface devices coupled to a network;
    identifying to the device driver a first link layer protocol to be implemented by the device driver, wherein the device driver comprises functionality required to implement each of the multiple link layer protocols;

configuring a device soft state structure for each of the one or more network interface devices with one or more attributes specific to said first link layer protocol;

receiving a at the device driver request from an upper level protocol;

in response to the request, assembling a header template corresponding to said first link layer protocol;

sending said header template to the upper level protocol; and if a topology of the network changes subsequent to said sending said header template, issuing a message to the upper level protocol to flush said header template.

14. The method of claim 13, wherein:

said receiving comprises receiving a DL_iNFO_REQ; and said responding comprises dynamically assembling data required to return a DL_INFO_ACK message block.

15. The method of claim 13, wherein:

said receiving comprises receiving a DL_lOC_HDR_INFO; and said responding comprises assembling a link layer header specific to said first link layer protocol.

16. The method of claim 15, further comprising:

recognizing a change in the topology of a network coupled to a first of the network interface devices; and issuing a message to the upper level protocol to flush said link layer header.

17. A computer readable storage medium storing instructions that, when executed by a computer, cause the computer to perform a method of selectively operating a network device driver to implement one of multiple link layer protocols, the method comprising:

attaching the device driver to one or more network interface devices coupled to a network;

identifying to the device driver a first link layer protocol to be implemented by the device driver, wherein the device driver comprises functionality required to implement each of the multiple link layer protocols;

configuring a device soft state structure for each of the one or more network interface devices with one or more attributes specific to said first link layer protocol;

receiving a request from an upper level protocol;

in response to the request, assembling a header template corresponding to said first link layer protocol;

sending said header template to the upper level protocol; and if a topology of the network changes subsequent to said sending said header template, issuing a message to the upper level protocol to flush said header template.

18. A computer system configured to selectively operate any one of multiple protocols with a single network interface device driver, the computer system comprising:

a device driver configured to: implement any one of the multiple protocols;

assemble a header template corresponding to a first protocol of the multiple protocols to be implemented by the device driver;

send said header template to the higher layer protocol for use in generating headers; and if a topology of a network coupled to the computer system changes, issue a message to the higher layer protocol to flush said header template;

configuration file for identifying the first protocol to the device driver;

one or more network interface devices configured to couple the computer system to one or more network links; and for each said network interface device, a device soft state structure managed by said device driver, wherein said device soft state structure is selectively configured with one or more attributes of said first protocol upon initialization of said device driver.

19. The computer system of claim 18, wherein the multiple protocols are layer two protocols, and said device driver is configured with functionality for implementing each of the multiple protocols.

20. The computer system of claim 18, wherein a first device soft state structure comprises a reference to a second device soft state structure.

21. The computer system of claim 18, wherein said one or more attributes comprise one or more of: a size of a maximum receive unit for said first protocol, a size of a maximum transfer unit for said first protocol, and an identifier of said first protocol.

22. The computer system of claim 18, wherein said one or more attributes comprise:

a reference to a packet receive function specific to said first protocol; and a reference to a packet header encapsulation function specific to said first protocol.

23. The method of claim 13, wherein said responding comprises:

consulting said device soft state structure to determine which of the multiple link layer protocols the device driver is implementing; and dynamically assembling from said device soft state structure one or more attributes of the device driver's implementation of the first link layer protocol.

* * * * *

UNITED STATES PATENT AND TRADEMARK OFFICE
CERTIFICATE OF CORRECTION

PATENT NO.        : 7,076,787 B2
APPLICATION NO. : 10/159579
DATED              : July 11, 2006
INVENTOR(S)       : Cheon et al.

It is certified that error appears in the above-identified patent and that said Letters Patent is hereby corrected as shown below:

In claim 8 (at column 16, line 20), replace "dl brdcst addr offset" with --dl_brdcst_addr_offset--.

In claim 13 (at column 17, line 4), replace "receiving a at the device driver request" with --receiving at the device driver a request--.

In claim 14 (at column 17, line 14), replace "DL_iNFO_REQ" with --DL_INFO_REQ--.

In claim 18, replace lines 1-22 of column 18 with :
a device driver configued to:
  -- implement any one of the multiple protocols;
    assemble a header template corresponding to a first
      protocol of the multiple protocols to be implemented
      by the device driver;
    send said header template to the higher layer protocol for
      use in generating headers; and
    if a topology of a network coupled to the computer
      system changes, issue a message to the higher
      layer protocol to flush said header template;
a configuration file for identifying the first protocol to the
      device driver;
one or more network interface devices configured to couple
      the computer system to one or more network links; and
for each said network interface device, a device soft state

UNITED STATES PATENT AND TRADEMARK OFFICE
CERTIFICATE OF CORRECTION

PATENT NO. : 7,076,787 B2
APPLICATION NO. : 10/159579
DATED : July 11, 2006
INVENTOR(S) : Cheon et al.

It is certified that error appears in the above-identified patent and that said Letters Patent is hereby corrected as shown below:

In Claim 18 (Cont'd),
structure managed by said device driver, wherein said device soft state structure is selectively configured with one or more attributes of said first protocol upon initialization of said device driver.--

Signed and Sealed this

Third Day of October, 2006

JON W. DUDAS
*Director of the United States Patent and Trademark Office*